United States Patent
Vangala et al.

(10) Patent No.: US 11,991,583 B2
(45) Date of Patent: May 21, 2024

(54) USER EQUIPMENT (UE) ENHANCEMENTS RELATING TO MEASUREMENT RELAXATION

(71) Applicant: QUALCOMM Incorporated, San Diego, CA (US)

(72) Inventors: Sudheer Kumar Reddy Vangala, San Diego, CA (US); Bapineedu Chowdary Gummadi, Hyderabad (IN); Ramakrishna Suresh Shanbhag, Bangalore (IN); Venkat Rasagna Reddy Komatireddy, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 192 days.

(21) Appl. No.: 17/644,304

(22) Filed: Dec. 14, 2021

(65) Prior Publication Data
US 2023/0189113 A1 Jun. 15, 2023

(51) Int. Cl.
*H04W 36/32* (2009.01)
*H04W 36/00* (2009.01)
*H04W 36/08* (2009.01)

(52) U.S. Cl.
CPC ....... *H04W 36/32* (2013.01); *H04W 36/0058* (2018.08); *H04W 36/00837* (2018.08); *H04W 36/08* (2013.01)

(58) Field of Classification Search
CPC ............. H04W 36/32; H04W 36/0058; H04W 36/00837; H04W 36/0088; H04W 36/08;
(Continued)

(56) References Cited

U.S. PATENT DOCUMENTS

| | | | |
|---|---|---|---|
| 2012/0122448 A1* | 5/2012 | Mueck | H04W 28/24 455/424 |
| 2016/0219446 A1* | 7/2016 | Ekici | H04W 24/10 |

(Continued)

FOREIGN PATENT DOCUMENTS

| | | |
|---|---|---|
| EP | 2587857 A2 | 5/2013 |
| EP | 3525515 A1 | 8/2019 |

(Continued)

OTHER PUBLICATIONS

International Search Report and Written Opinion—PCT/US2022/079188—ISA/EPO—dated Feb. 21, 2023.

*Primary Examiner* — Quoc Thai N Vu
(74) *Attorney, Agent, or Firm* — Weaver Austin Villeneuve & Sampson LLP—QUAL

(57) ABSTRACT

This disclosure provides systems, methods and apparatuses for controlling user equipment (UE) functionality associated with a mobility state. A UE may receive one or more mobility-based cell selection factors from a network. At least one mobility-based cell selection factor may indicate a preference for selecting a relatively lower-mobility cell. In some cell reselection examples, if a UE determines that multiple neighbor cells satisfy one or more cell reselection criteria, the UE may select the cell corresponding to the lowest mobility state. According to some call initiation examples in which a UE is configured for wireless communication via multiple subscriber services, the UE may select the subscriber service corresponding to the lower (or lowest) mobility state. According to some radio link failure (RLF) recovery examples in which there are multiple cells suitable for re-establishment, a UE may be configured to select a cell corresponding to the lowest mobility state.

29 Claims, 6 Drawing Sheets

(58) Field of Classification Search
CPC . H04W 36/0085; H04W 48/18; H04W 48/20; H04W 52/0209; Y02D 30/70
See application file for complete search history.

(56) References Cited

U.S. PATENT DOCUMENTS

| | | | |
|---|---|---|---|
| 2022/0007225 A1* | 1/2022 | Li | H04W 52/0245 |
| 2022/0174608 A1* | 6/2022 | Laselva | H04W 24/08 |
| 2023/0043593 A1* | 2/2023 | Lee | H04W 36/0094 |
| 2023/0209420 A1* | 6/2023 | Xie | H04W 36/32 |
| | | | 370/332 |
| 2023/0239712 A1* | 7/2023 | Kuang | H04W 76/28 |
| | | | 370/252 |

FOREIGN PATENT DOCUMENTS

| WO | WO2018201399 A1 | 11/2018 |
|---|---|---|
| WO | WO2021098803 A1 | 5/2021 |

* cited by examiner

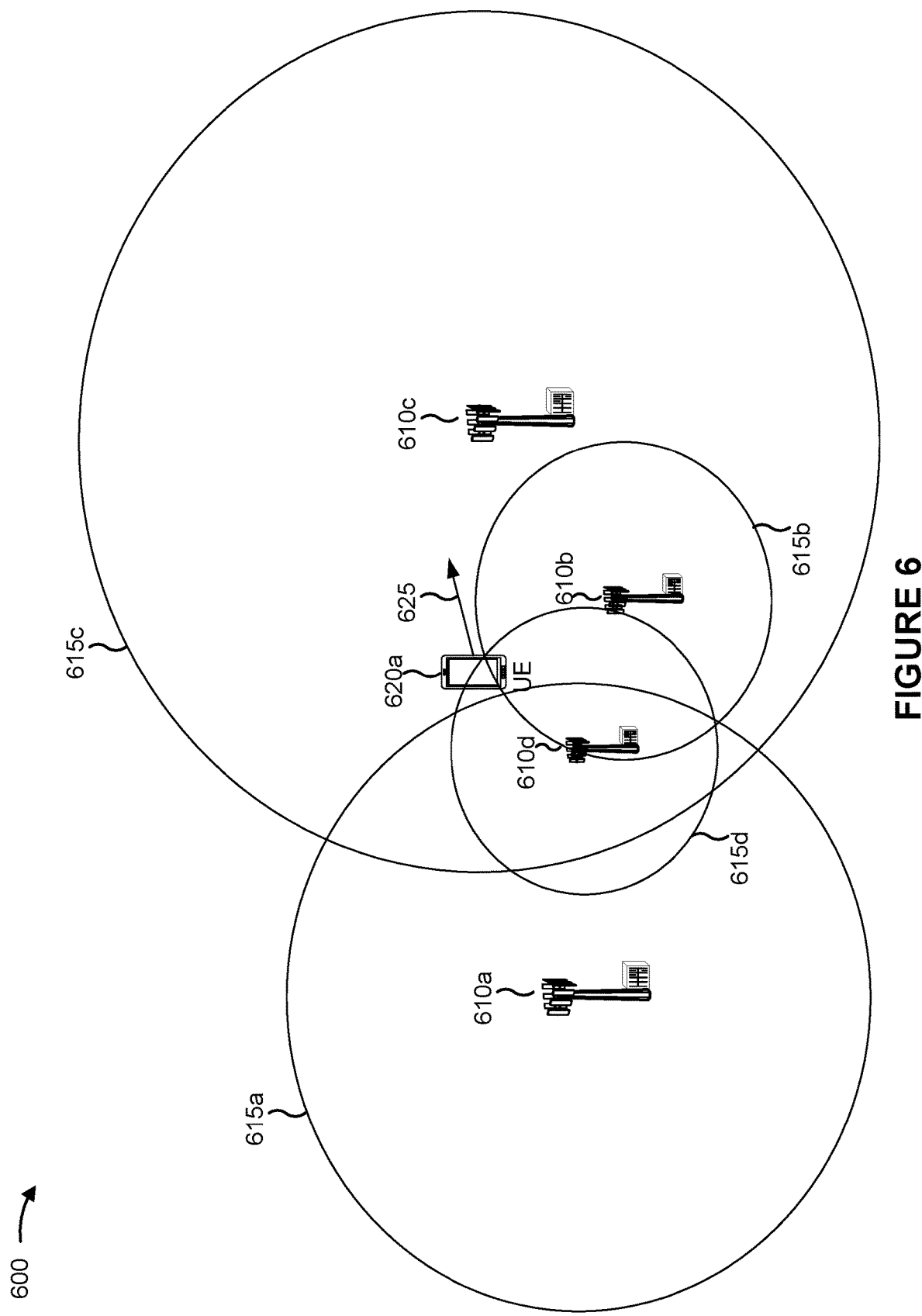

USER EQUIPMENT (UE) ENHANCEMENTS RELATING TO MEASUREMENT RELAXATION

TECHNICAL FIELD

Aspects of the present disclosure relate generally to wireless communication and to techniques for user equipment (UE) enhancements relating to measurement relaxation.

DESCRIPTION OF THE RELATED TECHNOLOGY

Wireless communication systems are widely deployed to provide various telecommunication services such as telephony, video, data, messaging, and broadcasts. Typical wireless communication systems may employ multiple-access technologies capable of supporting communication with multiple users by sharing available system resources (for example, bandwidth, transmit power, etc.). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink (DL) and uplink (UL). The DL (or forward link) refers to the communication link from the BS to the UE, and the UL (or reverse link) refers to the communication link from the UE to the BS. As will be described in more detail herein, a BS may be referred to as a NodeB, an LTE evolved nodeB (eNB), a gNB, an access point (AP), a radio head, a transmit receive point (TRP), a New Radio (NR) BS, a 5G NodeB, or the like.

The above multiple access technologies have been adopted in various telecommunication standards to provide a common protocol that enables different UEs to communicate on a municipal, national, regional, and even global level. NR, which also may be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency-division multiplexing (OFDM) with a cyclic prefix (CP) (CP-OFDM) on the DL, using CP-OFDM or SC-FDM (for example, also known as discrete Fourier transform spread OFDM (DFT-s-OFDM)) on the UL (or a combination thereof), as well as supporting beamforming, multiple-input multiple-output (MIMO) antenna technology, and carrier aggregation.

SUMMARY

The systems, methods, and devices of this disclosure each have several innovative aspects, no single one of which is solely responsible for the desirable attributes disclosed herein.

One innovative aspect of the subject matter described in this disclosure can be implemented in a method of wireless communication performed by a user equipment (UE). The method may include receiving one or more mobility-based cell selection factors. At least one of the one or more mobility-based cell selection factors may indicate a preference for selecting a relatively lower-mobility cell. The method may include receiving a first measurement configuration including one or more relaxed measurement conditions. At least one of the one or more relaxed measurement conditions may correspond with a relatively higher measurement periodicity associated with selection of the relatively lower-mobility cell. The method may include performing a cell selection or reselection process associated with the one or more mobility-based cell selection factors and the first measurement configuration. In some examples, the cell selection or reselection process may involve selecting a cell for which the one or more relaxed measurement conditions apply.

According to some examples, the cell selection or reselection process may involve a cell reselection process. In some such examples, the method may involve selecting a lowest-mobility cell of two or more qualifying cells that satisfy one or more cell reselection criteria.

In some implementations, the UE may be configured for wireless communication via at least a first network and a second network. In some such examples, the cell selection or reselection process may involve a cell selection process. According to some such examples, the method may involve determining that at least a first qualifying cell of the first network satisfies one or more cell selection criteria and determining that at least a second qualifying cell of the second network satisfies at least one of the one or more cell selection criteria. In some such examples, the method may involve determining whether the first qualifying cell or the second qualifying cell is a lower-mobility cell and selecting the lower-mobility cell for wireless communication via the first network or the second network.

In some implementations in which the UE is configured for wireless communication via at least a first network and a second network and in which the cell selection or reselection process involves a cell selection process, the method may involve selecting, associated with at least a first qualifying cell of the first network and at least a second qualifying cell of the second network each satisfying one or more cell selection criteria, the lower-mobility cell for wireless communication via the first network or the second network.

According to some examples in which the cell selection or reselection process involves a cell selection process, the method may involve receiving an indication of a radio link failure (RLF) prior to performing the cell selection process. In some such examples, the cell selection process may involve selecting a lowest-mobility cell of two or more qualifying cells that satisfy one or more cell selection criteria.

Another innovative aspect of the subject matter described in this disclosure can be implemented in a UE configured for wireless communication. The UE may include an interface system and a control system coupled to the interface system. The control system may be configured to receive, via the interface system, one or more mobility-based cell selection factors. At least one of the one or more mobility-based cell selection factors may indicate a preference for selecting a relatively lower-mobility cell. In some implementations, the control system may be configured to receive, via the interface system, a first measurement configuration including one or more relaxed measurement conditions. At least one of the one or more relaxed measurement conditions may correspond with a relatively higher measurement periodicity associated with selection of the relatively lower-mobility cell. According to some implementations, the control system may be configured to perform a cell selection or reselection process associated with the one or more mobility-based cell selection factors and the first measurement configuration.

Another innovative aspect of the subject matter described in this disclosure can be implemented in a non-transitory computer-readable medium. The non-transitory computer-readable medium may store one or more instructions for wireless communication. The one or more instructions, when executed by a control system of a UE, may cause the control system to receive one or more mobility-based cell selection factors. At least one of the one or more mobility-based cell selection factors may indicate a preference for selecting a relatively lower-mobility cell. In some examples, the one or more instructions may cause the control system to receive a first measurement configuration including one or more relaxed measurement conditions. At least one of the one or more relaxed measurement conditions may correspond with a relatively higher measurement periodicity associated with selection of the relatively lower-mobility cell. According to some implementations, the one or more instructions may cause the control system to perform a cell selection or reselection process associated with the one or more mobility-based cell selection factors and the first measurement configuration.

Another innovative aspect of the subject matter described in this disclosure can be implemented in an apparatus for wireless communication. The apparatus may include interface means and control means for receiving, via the interface means, one or more mobility-based cell selection factors. At least one of the one or more mobility-based cell selection factors may indicate a preference for selecting a relatively lower-mobility cell. In some implementations, the control means may include means for receiving, via the interface means, a first measurement configuration including one or more relaxed measurement conditions. At least one of the one or more relaxed measurement conditions may correspond with a relatively higher measurement periodicity associated with selection of the relatively lower-mobility cell. According to some implementations, the control means may include means for performing a cell selection or reselection process associated with the one or more mobility-based cell selection factors and the first measurement configuration.

Aspects generally include a method, apparatus, system, computer program product, non-transitory computer-readable medium, user equipment, base station, wireless communication device, control system, or combinations thereof as substantially described herein with reference to and as illustrated by the accompanying drawings.

Details of one or more implementations of the subject matter described in this disclosure are set forth in the accompanying drawings and the description below. Other features, aspects, and advantages will become apparent from the description, the drawings and the claims. Note that the relative dimensions of the following figures may not be drawn to scale.

BRIEF DESCRIPTION OF THE DRAWINGS

FIG. 6 is a diagram illustrating another example of a UE that is located within multiple overlapping cell coverage areas.

Like reference numbers and designations in the various drawings indicate like elements.

DETAILED DESCRIPTION

Figure 1:
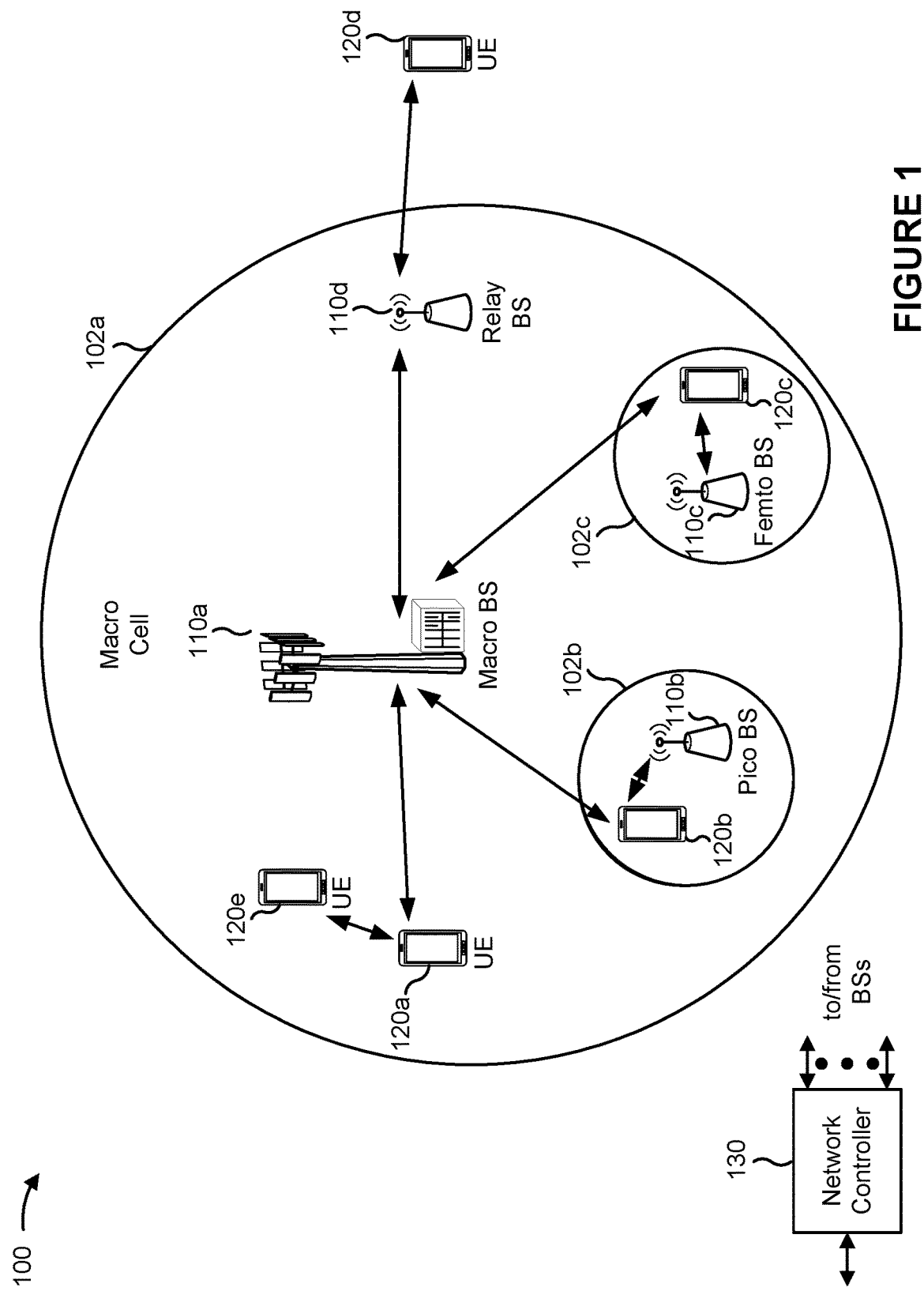
FIG. 1 is a block diagram conceptually illustrating an example of a wireless network.

The following description is directed to certain implementations for the purposes of describing the innovative aspects of this disclosure. However, a person having ordinary skill in the art will readily recognize that the teachings herein can be applied in a multitude of different ways. Some of the examples in this disclosure are based on wireless and wired local area network (LAN) communication according to the Institute of Electrical and Electronics Engineers (IEEE) 802.11 wireless standards, the IEEE 802.3 Ethernet standards, and the IEEE 1901 Powerline communication (PLC) standards. However, the described implementations may be implemented in any device, system or network that is capable of transmitting and receiving radio frequency signals according to any of the wireless communication standards, including any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

In some instances, a UE can consume a significant amount of power during the processes of measuring the signal strength of a serving cell (such as a cell currently being used for a cellular call) and neighbor cells (cells near the serving cell, such as cells adjacent to the serving cell). Selecting and reselecting cells, enabling handovers between cells and recovering from radio link failure (RLF) also can cause a UE to consume a significant amount of power. Moreover, the consequences of RLF (such as dropped calls) may cause user dissatisfaction.

In some disclosed examples, UE functionality, including but not limited to the frequency of measuring the signal strength of a serving cell and neighbor cells, may be based in part on "mobility." As used herein, the term "mobility" corresponds not only to the velocity (speed and direction) of the UE, but also to the local network (NW) deployment. In a relatively higher-mobility state, a UE will generally switch from one cell to another more frequently than in a lower-mobility state. In some cell reselection examples, if the UE determines that multiple neighbor cells satisfy one or more cell reselection criteria, the UE may select the cell corresponding to the lowest mobility state. According to some call initiation examples in which a UE is configured for wireless communication via multiple subscriber services, the UE may select the subscriber service corresponding to the lower (or lowest) mobility state. According to some RLF recovery examples in which there are multiple cells suitable for re-establishment, a UE may be configured to select a cell corresponding to the lowest mobility state.

Particular implementations of the subject matter described in this disclosure can be implemented to realize one or more of the following potential advantages. In some examples, selecting a cell corresponding with a low mobility state may cause a UE to use relatively less power than selecting cell corresponding with a high-mobility state. In some implementations, the power savings may be associated with the UE performing signal strength measurements of a serving cell and neighbor cells relatively less frequently. Such relatively less frequent measurements may be referred to herein as "measurement relaxation" or "relaxed measurement requirements." The power savings also may be associated with relatively fewer resulting dropped calls and handovers. Having relatively fewer resulting dropped calls, reselections and handovers also may improve the user experience.

FIG. 1 is a block diagram conceptually illustrating an example of a wireless network 100. The wireless network 100 may be an LTE network or some other wireless network, such as a 5G or NR network. Wireless network 100 may include a number of BSs 110 (shown as BS 110a, BS 110b, BS 110c, and BS 110d) and other network entities. A BS is an entity that communicates with user equipment (UEs) and also may be referred to as a base station, a NR BS, a Node B, a gNB, a 5G node B (NB), an access point, a transmit receive point (TRP), or the like. Each BS may provide communication coverage for a particular geographic area. In 3GPP, the term "cell" can refer to a coverage area of a BS, a BSsubsystem serving this coverage area, or a combination thereof, depending on the context in which the term is used.

A BS may provide communication coverage for a macro cell, a pico cell, a femto cell, another type of cell, or a combination thereof. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB", "base station", "NR BS", "gNB", "TRP", "AP", "node B", "5G NB", and "cell" may be used interchangeably herein.

In some examples, a cell may not necessarily be stationary, and the geographic area of the cell may move according to the location of a mobile BS. In some examples, the BSs may be interconnected to one another as well as to one or more other BSs or network nodes (not shown) in the wireless network 100 through various types of backhaul interfaces, such as a direct physical connection, a virtual network, or a combination thereof using any suitable transport network.

Wireless network 100 also may include relay stations. A relay station is an entity that can receive a transmission of data from an upstream station (for example, a BS or a UE) and send a transmission of the data to a downstream station (for example, a UE or a BS). A relay station also may be a UE that can relay transmissions for other UEs. In the example shown in FIG. 1, a relay station 110d may communicate with macro BS 110a and a UE 120d in order to facilitate communication between BS 110a and UE 120d. A relay station also may be referred to as a relay BS, a relay base station, a relay, etc.

Wireless network 100 may be a heterogeneous network that includes BSs of different types, for example, macro BSs, pico BSs, femto BSs, relay BSs, etc. These different types of BSs may have different transmit power levels, different coverage areas, and different impacts on interference in wireless network 100. For example, macro BSs may have a high transmit power level (for example, 5 to 40 Watts) whereas pico BSs, femto BSs, and relay BSs may have lower transmit power levels (for example, 0.1 to 2 Watts).

As described herein, any of the BS 110a, BS 110b, BS 110c, and BS 110d may include one or more components that are located at a single physical location or one or more components located at various physical locations. In examples in which the BS 110a, BS 110b, BS 110c, and BS 110d includes components that are located at various physical locations, the various components may each perform various functions such that, collectively, the various components achieve functionality that is similar to a BS 110a, BS 110b, BS 110c, and BS 110d that is located at a single physical location. As such, a BS 110a, BS 110b, BS 110c, and BS 110d described herein may equivalently refer to a standalone BS (also known as a monolithic BS) or a BS including components that are located at various physical locations or virtualized locations (also known as a disaggregated BS). In some implementations, such a BS 110a, BS 110b, BS 110c, and BS 110d including components that are located at various physical locations may be referred to as or may be associated with a disaggregated radio access network (RAN) architecture, such as an Open RAN (O-RAN) or Virtualized RAN (VRAN) architecture. In some implementations, such components of a BS 110a, BS 110b, BS 110c, and BS 110d may include or refer to one or more of a central unit (or centralized unit CU), a distributed unit (DU), or a radio unit (RU).

A network controller 130 may couple to a set of BSs and may provide coordination and control for these BSs. Network controller 130 may communicate with the BSs via a backhaul. The BSs also may communicate with one another, for example, directly or indirectly via a wireless or wireline backhaul.

UEs 120 (for example, 120a, 120b, 120c) may be dispersed throughout wireless network 100, and each UE may be stationary or mobile. A UE also may be referred to as an access terminal, a terminal, a mobile station, a subscriber unit, a station, etc. A UE may be a cellular phone (for example, a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, etc., that may communicate with a base station, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices or may be implemented as NB-IoT (narrowband internet of things) devices. Some UEs may be considered a Customer Premises Equipment (CPE). UE 120 may be included inside a housing that houses components of UE 120, such as processor components, memory components, similar components, or a combination thereof.

In general, any number of wireless networks may be deployed in a given geographic area. Each wireless network may support a particular RAT and may operate on one or more frequencies. A RAT also may be referred to as a radio technology, an air interface, etc. A frequency also may be referred to as a carrier, a frequency channel, etc. Each frequency may support a single RAT in a given geographic area in order to avoid interference between wireless networks of different RATs. In some cases, NR or 5G RAT networks may be deployed.

In some examples, access to the air interface may be scheduled, where a scheduling entity (for example, a base station) allocates resources for communication among some or all devices and equipment within the scheduling entity's service area or cell. Within the present disclosure, as discussed further herein, the scheduling entity may be responsible for scheduling, assigning, reconfiguring, and releasing resources for one or more subordinate entities. That is, for scheduled communication, subordinate entities utilize resources allocated by the scheduling entity.

Base stations are not the only entities that may function as a scheduling entity. That is, in some examples, a UE may function as a scheduling entity, scheduling resources for one or more subordinate entities (for example, one or more other UEs). In this example, the UE is functioning as a scheduling entity, and other UEs utilize resources scheduled by the UE for wireless communication. A UE may function as a scheduling entity in a peer-to-peer (P2P) network, in a mesh network, or another type of network. In a mesh network example, UEs may optionally communicate directly with one another in addition to communicating with the scheduling entity.

Thus, in a wireless communication network with a scheduled access to time—frequency resources and having a cellular configuration, a P2P configuration, and a mesh configuration, a scheduling entity and one or more subordinate entities may communicate utilizing the scheduled resources.

In some aspects, two or more UEs 120 (for example, shown as UE 120a and UE 120e) may communicate directly using one or more sidelink channels (for example, without using a base station 110 as an intermediary to communicate with one another). For example, the UEs 120 may commu-nicate using peer-to-peer (P2P) communications, device-to-device (D2D) communications, a vehicle-to-everything (V2X) protocol (which may include a vehicle-to-vehicle (V2V) protocol, a vehicle-to-infrastructure (V2I) protocol, or similar protocol), a mesh network, or similar networks, or combinations thereof. In this case, the UE 120 may perform scheduling operations, resource selection operations, as well as other operations described elsewhere herein as being performed by the base station 110.

Figure 2:
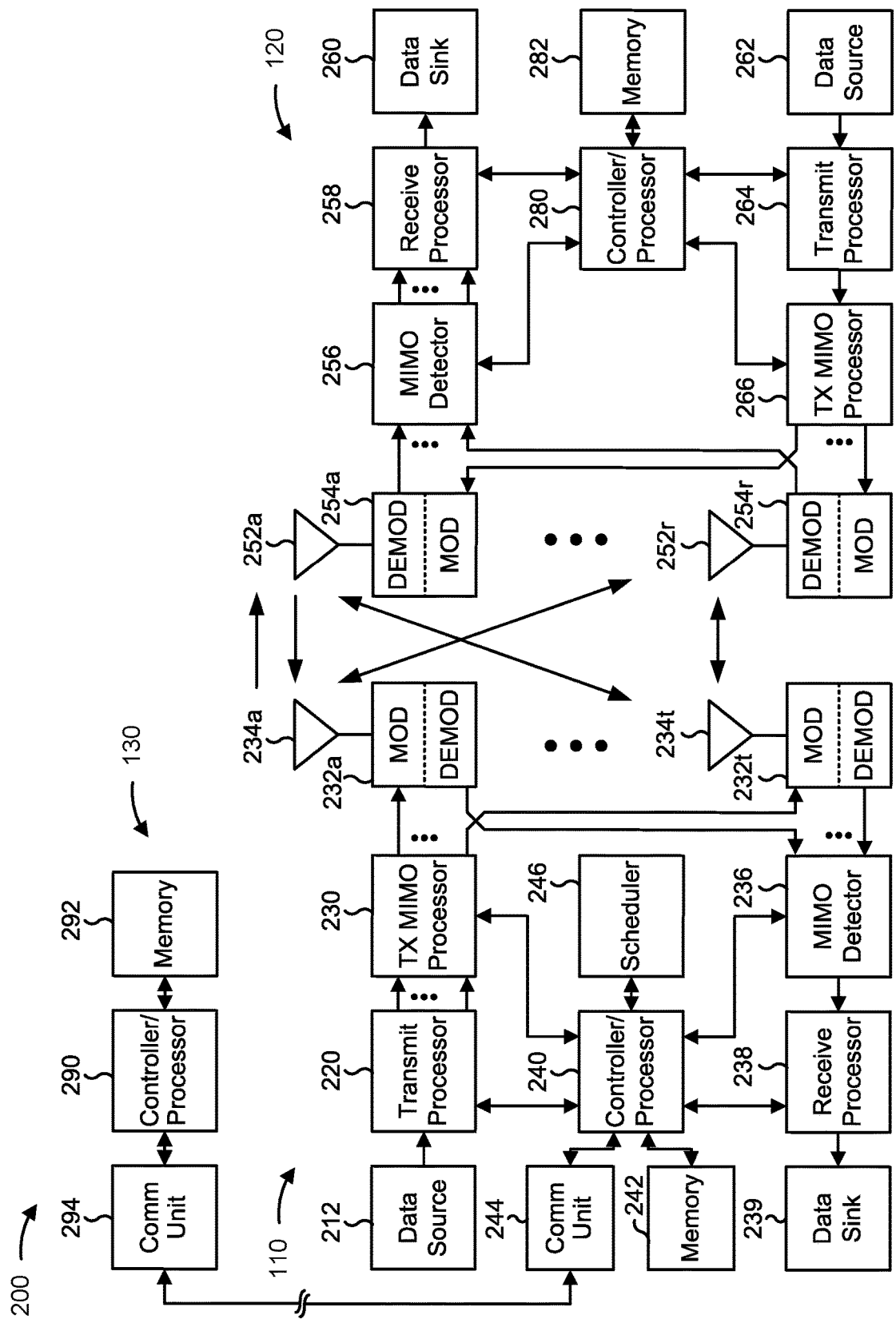
FIG. 2 is a block diagram conceptually illustrating an example of a base station in communication with a UE in a wireless network.

FIG. 2 is a block diagram conceptually illustrating an example 200 of a base station 110 in communication with a UE 120. In some aspects, base station 110 and UE 120 may respectively be one of the base stations and one of the UEs in wireless network 100 of FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. The transmit processor 220 also may process system information (for example, for semi-static resource partitioning information (SRPI), etc.) and control information (for example, CQI requests, grants, upper layer signaling, etc.) and provide overhead symbols and control symbols. The transmit processor 220 also may generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, the reference symbols, or combinations thereof, if applicable, and may provide T output symbol streams to T modulators (MODs) 232a through 232t. Each modulator 232 may process a respective output symbol stream (for example, for OFDM, etc.) to obtain an output sample stream. Each modulator 232 may further process (for example, convert to analog, amplify, filter, and upconvert) the output sample stream to obtain a downlink signal. T downlink signals from modulators 232a through 232t may be transmitted via T antennas 234a through 234t, respectively. According to various aspects described in more detail herein, the synchronization signals can be generated with location encoding to convey additional information.

At UE 120, antennas 252a through 252r may receive the downlink signals from base station 110 or other base stations and may provide received signals to demodulators (DE-MODs) 254a through 254r, respectively. Each demodulator 254 may condition (for example, filter, amplify, downconvert, and digitize) a received signal to obtain input samples. Each demodulator 254 may further process the input samples (for example, for OFDM, etc.) to obtain received symbols. A MIMO detector 256 may obtain received symbols from all R demodulators 254a through 254r, perform MIMO detection on the received symbols if applicable, and provide detected symbols. A receive processor 258 may process (for example, demodulate and decode) the detected symbols, provide decoded data for UE 120 to a data sink 260, and provide decoded control information and system information to a controller or processor (controller/processor) 280. A channel processor (which may be implemented by the receive processor 258, by the controller/processor 280 or by one or more other components of the UE 120) may determine reference signal received power (RSRP), received signal strength indicator (RSSI), reference signal received quality (RSRQ), channel quality indicator (CQI), etc. In some aspects, one or more components of UE 120 may be included in a housing.

On the uplink, at UE 120, a transmit processor 264 may receive and process data from a data source 262 and control information (for example, for reports including RSRP, RSSI, RSRQ, CQI, etc.) from controller/processor 280. Transmit processor 264 also may generate reference symbols for one or more reference signals. The symbols from transmit processor 264 may be precoded by a TX MIMO processor 266 if applicable, further processed by modulators 254a through 254r (for example, for DFT-s-OFDM, CP-OFDM, etc.), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to a controller or processor (i.e., controller/processor) 240. The base station 110 may include communication unit 244 and communicate to network controller 130 via communication unit 244. The network controller 130 may include communication unit 294, a controller or processor (i.e., controller/processor) 290, and memory 292.

The controller/processor 240 of base station 110, the controller/processor 280 of UE 120, or any other component(s) of FIG. 2 may perform one or more techniques associated with UE enhancements related to mobility and measurement relaxation, as described in more detail elsewhere herein. For example, the controller/processor 280 of UE 120, or other component(s) (or combinations of components) of FIG. 2, may perform or direct operations of, for example, process 400 of FIG. 4 or other processes described herein (such as the methods described with reference to FIGS. 3, 5 and 7). The memories 242 and 282 may store data and program codes for base station 110 and UE 120, respectively. A scheduler 246 may schedule UEs for data transmission on the downlink, the uplink, or a combination thereof.

The stored program codes, when executed by the controller/processor 280 or other processors and modules at UE 120, may cause the UE 120 to perform operations described with respect to process 400 of FIG. 4 or other processes described herein (such as the methods described with reference to FIGS. 3, 5 and 7). A scheduler 246 may schedule UEs for data transmission on the downlink, the uplink, or a combination thereof.

In some aspects, the UE 120 may include means for receiving one or more mobility-based cell selection factors. At least one of the one or more mobility-based cell selection factors may indicate a preference for selecting a relatively lower-mobility cell. The UE 120 may include means for receiving a first measurement configuration including one or more relaxed measurement conditions. At least one of the one or more relaxed measurement conditions may correspond with a relatively higher measurement periodicity associated with selection of the relatively lower-mobility cell. The UE 120 may include means for performing a cell selection or reselection process associated with the one or more mobility-based cell selection factors and the first measurement configuration, or the like, or combinations thereof. In some aspects, such means may include one or more components of UE 120 described in connection with FIG. 2, including but not limited to the controller/processor 280.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, the TX MIMO processor 266, or another processor may be performed by or under the control of controller/processor 280. The transmit processor 264, the receive processor 258, the TX MIMO processor 266 and the controller/processor 280 may be referred to collectively herein as elements included in a "control system" of the UE 120. Similarly, transmit processor 220, the receive processor 238, the TX MIMO processor 230 and the controller/processor 240 may be referred to collectively herein as elements included in a control system of the BS 110. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. According to this example, the UE 120 includes what may be referred to herein as an "interface system." As used herein, the term "interface system" encompasses interfaces between the UE 120 and the outside world as well as internal interfaces (interfaces between components of the UE 120). In this example, the interfaces between the UE 120 and the outside world include antennas 252a-252r, which also may be regarded as components of a wireless interface system. According to this example, the internal interfaces include the interfaces between the controller/processor 280 and other elements of the UE 120, including the MIMO detector 256, the receive processor 258, the memory 282, the transmit processor 264 and the TX MIMO processor 266. Accordingly, at least a portion of the interface system may be coupled to the control system. In some implementations, the interface system may include a user interface system. The user interface system may include a display, a touch sensor system, a gesture sensor system, etc.

While some techniques are described herein in connection with frames, subframes, slots, or the like, these techniques may equally apply to other types of wireless communication structures, which may be referred to using terms other than "frame," "subframe," "slot," or the like in 5G NR. In some aspects, a wireless communication structure may refer to a periodic time-bounded communication unit defined by a wireless communication standard or protocol.

In certain telecommunications (for example, NR), a base station may transmit synchronization signals. For example, a base station may transmit a primary synchronization signal (PSS), a secondary synchronization signal (SSS), or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station also may transmit a physical broadcast channel (PBCH). The PBCH may carry some system information, such as system information that supports initial access by UEs. The PBCH may include a master information block (MIB) that indicates the location of a system information block (SIB)), which may include information for the UE's initial access to the network.

In some aspects, the base station may transmit the PSS, the SSS, the PBCH, or a combination thereof in accordance with a synchronization communication hierarchy (for example, a synchronization signal (SS) hierarchy) including multiple synchronization communications (for example, SS blocks). In some examples, the base station may transmit information in an SS block indicating criteria for the UE to use for signal strength measurements, such as reference signal received power (RSRP) measurements. According to some such examples, the base station may transmit a PBCH in an SS block that includes information that a UE can use for signal strength measurements. In some such examples, the PBCH may include a Demodulation Reference Signal (DMRS) that a UE can use for RSRP measurements.

While aspects of the examples described herein may be associated with NR or 5G technologies, aspects of the present disclosure may be applicable with other wireless communication systems. New radio (NR) may refer to radios configured to operate according to a new air interface (for example, other than Orthogonal Frequency Divisional Multiple Access (OFDMA)-based air interfaces) or fixed transport layer (for example, other than Internet Protocol (IP)). In aspects, NR may utilize OFDM with a CP (herein referred to as cyclic prefix OFDM or CP-OFDM) or SC-FDM on the uplink, may utilize CP-OFDM on the downlink and include support for half-duplex operation using Time Division Duplex (TDD). In aspects, NR may, for example, utilize OFDM with a CP (herein referred to as CP-OFDM) or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (for example, 80 megahertz (MHz) and beyond), millimeter wave (mmW or mmWave) targeting high carrier frequency (for example, 60 gigahertz (GHz)), massive MTC (mMTC) targeting non-backward compatible MTC techniques, or mission critical targeting ultra reliable low latency communications (URLLC) service.

Figure 3:
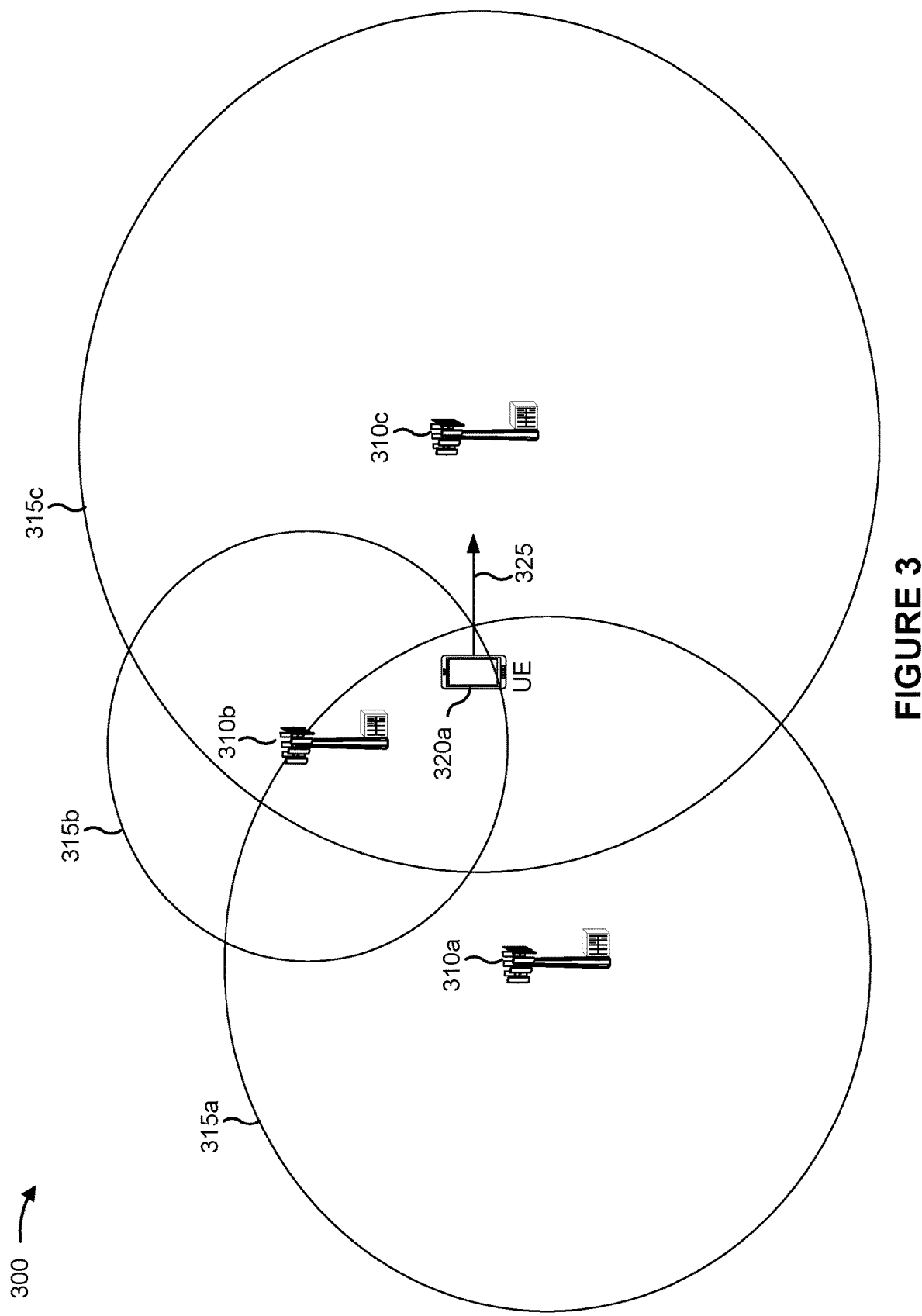
FIG. 3 is a diagram illustrating an example of a user equipment (UE) that is located within multiple overlapping cell coverage areas.

FIG. 3 is a diagram illustrating an example 300 of a user equipment (UE) that is located within multiple overlapping cell coverage areas. As with other figures provided in this disclosure, the numbers, types and arrangements of elements shown in FIG. 3 are merely made by way of example. Other implementations may include different numbers, types or arrangements of elements.

According to this example, the BSs 310a-310c are instances of the macro BS 110a of FIG. 1, and are instances of the BS 110 of FIG. 2. In some alternative examples, one or more of the BSs 310a-310c (for example, BS 310b) may be instances of the pico BS 110b or the femto BS 110c of FIG. 1. In this implementation, the coverage area 315a corresponds to the BS 310a, the coverage area 315b corresponds to the BS 310b and the coverage area 315c corresponds to the BS 310c.

The UE 320a may, for example, be an instance of one of the UEs 120a-120e of FIG. 1, an instance of the UE 120 of FIG. 2, etc. In this example, the arrow 325 indicates the direction in which the UE 320a is moving. At the time represented by FIG. 3, the UE 320a is located within all three of the coverage areas 315a-315c.

In some examples, the UE 320a may be operating in 5G standalone (SA) mode and in some instances the UE 320a may be operating in 5G non-standalone (NSA) mode, or in another mode. During some times the UE 320a may be operating in an idle mode, whereas at other times the UE 320a may be operating in a connected mode. According to some SA examples, the UE 320a may be configured for idle mode mobility (such as cell selection and reselection) and configured for connected mode mobility according to one or more of the 5G SA procedures promulgated by the Third Generation Partnership Project (3GPP), such as according to the procedures disclosed in 3GPP Technical Specification (TS) Release 15 ("Release 15"), the procedures disclosed in 3GPP TS Release 16 ("Release 16"), etc.

Whether operating in idle mode or in connected mode, the UE 320a may periodically measure the strength of signals from a serving cell and neighbor cells, which may include the BSs 310a-310c in this example. In some examples, the UE 320a may measure the signal strengths according to measurement configuration information that has previously been received from a network via a BS. For example, the UE 320a may have received system information (such as information in a system information block (SIB)) that includes criteria for the UE to use for signal strength measurements, such as reference signal received power (RSRP) measurements.

The UE 320a may consume a significant amount of power performing signal strength measurements. Selecting and reselecting cells, enabling handovers between cells and recovering from radio link failure (RLF) also can cause a UE to consume a significant amount of power.

In some disclosed examples, functionality of the UE 320a, including but not limited to the frequency of measuring the signal strength from BSs 310a-310c (or other BSs), may be based in part on "mobility." As noted elsewhere herein, the term "mobility" corresponds not only to the velocity (speed and direction) of the UE, but also to the local network (NW) deployment. If the NW deployment is dense (which also may be referred to herein as "heavy"), with multiple cells within a small geographic area (such as within a city block), the UE is likely to be changing from one serving cell to another relatively more frequently even if the UE is moving at a relatively slow speed, such as a walking or running speed. This condition is referred to herein as a high-mobility state. If the NW deployment is sparse (which also may be referred to herein as "light"), with cells spanning a larger geographic area (such as a coverage area having a radius of a kilometer or more), the UE is likely to be changing from one serving cell to another relatively less frequently if the UE is moving at the same speed. This condition is referred to herein as a low-mobility state.

In some examples, a UE may receive one or more mobility-based cell selection or reselection factors. For example, the UE may receive the one or more mobility-based cell selection or reselection factors from a network via a BS. (A mobility-based cell selection or reselection factor may sometimes be referred to herein simply as a "cell selection factor.") At least one of the one or more mobility-based cell selection or reselection factors may indicate a preference for selecting a relatively lower-mobility cell (in other words, a cell corresponding to a relatively lower-mobility state). In some examples, at least one mobility-based cell selection factor may indicate that cell mobility is associated with a cell coverage area. According to some such examples, at least one mobility-based cell selection factor may indicate that a relatively lower cell mobility corresponds to a relatively larger cell coverage area. In some examples, at least one mobility-based cell selection factor may indicate that a relatively lower cell mobility corresponds with a relatively longer time between actual or expected instances of cell reselection or handover for the UE during a time interval. According to some examples, at least one mobility-based cell selection factor may indicate that a relatively lower cell mobility corresponds with relatively less variation in actual or expected reference signal received power (RSRP) during a time interval.

In some such examples, the UE may be configured to perform a cell selection or reselection process associated with the one or more mobility-based cell selection factors. In some cell reselection examples, if a UE determines that multiple neighbor cells are suitable (for example, if the UE determines that multiple neighbor cells satisfy one or more cell reselection criteria), the UE may select the cell corresponding to a lower mobility state (or a cell corresponding to the lowest mobility state).

In one example, the UE 320a may be operating in an idle mode and may be camped on the BS 310a. In some examples, the UE 320a may be configured to initiate a cell reselection process responsive to one or more cell reselection triggers. The criteria for a cell reselection process, including but not limited to one or more cell reselection trigger criteria, also may have been previously received from a network currently being used by the UE 320a. In the example shown in FIG. 3, the UE 320a is near the edge of the coverage area 315a corresponding to the BS 310a. Accordingly, in this example the trigger corresponds to the BS 310a nearing the edge of the coverage area 315a and may, for example, correspond with the measured strength (such as the RSRP) of signals from the BS 310a falling below a threshold level, the measured signal strength of one or more neighbor cells (such as the signals from the BS 310b or the BS 310c) being at or above an absolute threshold, the measured signal strength of one or more neighbor cells being stronger than that of the signals from the BS 310a by a delta, etc.

In some examples, the UE 320a may determine that more than one cell is suitable for cell reselection. For example, the UE 320a may determine that both the BS 310b and the BS 310c satisfy one or more cell reselection criteria, such as one or more signal strength criteria. According to some such examples, the UE may perform the cell reselection process based on the received one or more mobility-based cell selection factors. For example, one mobility-based cell selection factor may correspond with selecting a lowest-mobility cell of two or more qualifying cells that satisfy one or more cell reselection criteria. (In this context, even if there are only two qualifying cells, the lower-mobility cell may sometimes be referred to herein as the "lowest-mobility cell.") In this example, the UE 320a determines that the BS 310c has a lower mobility than the BS 310b and chooses the BS 310c for cell reselection.

In some examples, the one or more mobility-based cell selection factors received by the UE 320a may include a threshold for the rate of change of signal strength, such as the rate of change of RSRP. If the UE 320a's measurements of signals from the BS 310b and the BS 310c indicate that signals from the BS 310b have a higher rate of change of signal strength than signals from the BS 310c, the UE 320a may determine that signals from the BS 310b indicate a relatively higher mobility state and that that signals from the BS 310c indicate a relatively lower mobility state. According to some examples, the one or more mobility-based cell selection factors received by the UE 320a may include a threshold time interval during which the rate of change of signal strength, such as the rate of change of RSRP, exceeds a threshold. If the UE 320a determines that signals from the BS 310b have a rate of change of signal strength that equals or exceeds the rate of change threshold for a time duration that equals or exceeds the time threshold and that signals from the BS 310c do not have a rate of change of signal strength that equals or exceeds the rate of change threshold for a time duration that equals or exceeds the time threshold, the UE 320a may determine that signals from the BS 310b indicate a relatively higher mobility state and that signals from the BS 310c indicate a relatively lower mobility state.

In some examples, the UE 320a may receive (or may have received) from the network a measurement configuration including one or more relaxed measurement conditions. According to some such examples, at least one of the one or more relaxed measurement conditions may correspond with a relatively higher measurement periodicity associated with selection or reselection of a relatively lower-mobility cell. As the term "measurement periodicity" is used herein, a relatively higher measurement periodicity corresponds with relatively less frequent measurements, because the relatively higher measurement periodicity corresponds with a relatively longer time interval between measurements.

In some examples, the measurement configuration may be associated with the structural deployment of the network (the density of cells, the environmental density, etc.). For example, in rural areas the density of cells may be relatively less (and cell coverage areas may be greater) than in urban areas. Accordingly, UE measurements in rural areas may be more relaxed compared to measurements in urban areas for the same signal strength level (such as RSRP level). In some implementations, different networks in the same area may configure different measurement configuration parameters based on the deployment of each network. In some examples the measurement configuration may be associated with the operating frequencies. For example, if the operating frequencies are in the mmWave range, the signal strength levels may fluctuate even if a UE is stationary or nearly stationary, especially if the path between the UE and the BS is blocked or partially blocked.

In one such example, when the network is in a high-mobility state (for example, when a cell providing network service corresponds to a high-mobility state), the measurement configuration may indicate that the UE 320a should perform measurements once per second, whereas when the network is in a low-mobility state, the measurement configuration may indicate that the UE 320a should perform measurements once per multiple seconds, (such as once every 2 seconds, once every 3 seconds, once every 4 seconds, once every 5 seconds, once every 6 seconds, etc.). In another such example, when the network is in a high-mobility state, the measurement configuration may indicate that the UE 320a should perform measurements once per paging cycle (such as once per discontinuous reception (DRX) cycle), whereas when the network is in a low-mobility state, the measurement configuration may indicate that the UE 320a should perform measurements once per multiple paging cycles (for example once every 2 paging cycles, once every 3 paging cycles, once every 4 paging cycles, once every 5 paging cycles, once every 6 paging cycles, etc.). According to some implementations, two or more mobility states may each have a corresponding measurement periodicity. If the UE 320a performs measurements, such as signal strength measurements, with a relatively longer time interval between measurements, the BS 310b will conserve power.

Some implementations may involve performing a cell selection or reselection process associated with the one or more mobility-based cell selection factors and the measurement configuration. For example, referring again to FIG. 3, the cell reselection process performed by the UE 320a may be associated with the one or more mobility-based cell selection factors and the first measurement configuration. In some such examples, the cell reselection process may be initiated responsive to the UE 320a determining that one or more cell reselection trigger conditions have been satisfied, such as the trigger conditions described herein.

However, in some implementations the UE 320a may be configured to initiate a cell reselection process even if no signal-strength-based cell reselection trigger conditions have been satisfied. According to some such implementations, if the UE 320a determines a high-mobility condition corresponding with the BS on which the UE 320a is camped, the UE 320a may initiate a cell reselection process even if no signal-strength-based cell reselection trigger conditions (also referred to herein as "cell reselection criteria") have been satisfied. Some such examples may involve selecting a lowest-mobility cell from among two or more cells associated with one or more cell reselection criteria not being satisfied.

Such implementations may be potentially advantageous when, for example, the serving cell is a subset of a main cell. There may be, for example, a main cell and multiple small cells. In some instances, the serving cell may be a small cell, such as a mmWave cell, an Integrated Access and Backhaul (IAB) node, etc. In such cases, the mobility state may play an important role in performance. For example, if the UE 320a is static, the UE 320a may camp on a small cell or an IAB node, but if the UE 320a is moving, the UE 320a may camp on the main cell and avoid selecting cells corresponding with a lower mobility state (such as cells having a smaller coverage area). Even if a person using the UE 320a is walking or running, there may be a high-mobility state with respect to a small cell, but there may be a low mobility state with respect to the main cell. According to some examples, if the UE 320a is camped on a small cell and starts moving, the UE 320a may reselect the main cell even if no signal-strength-based cell reselection trigger conditions have been satisfied.

Figure 4:
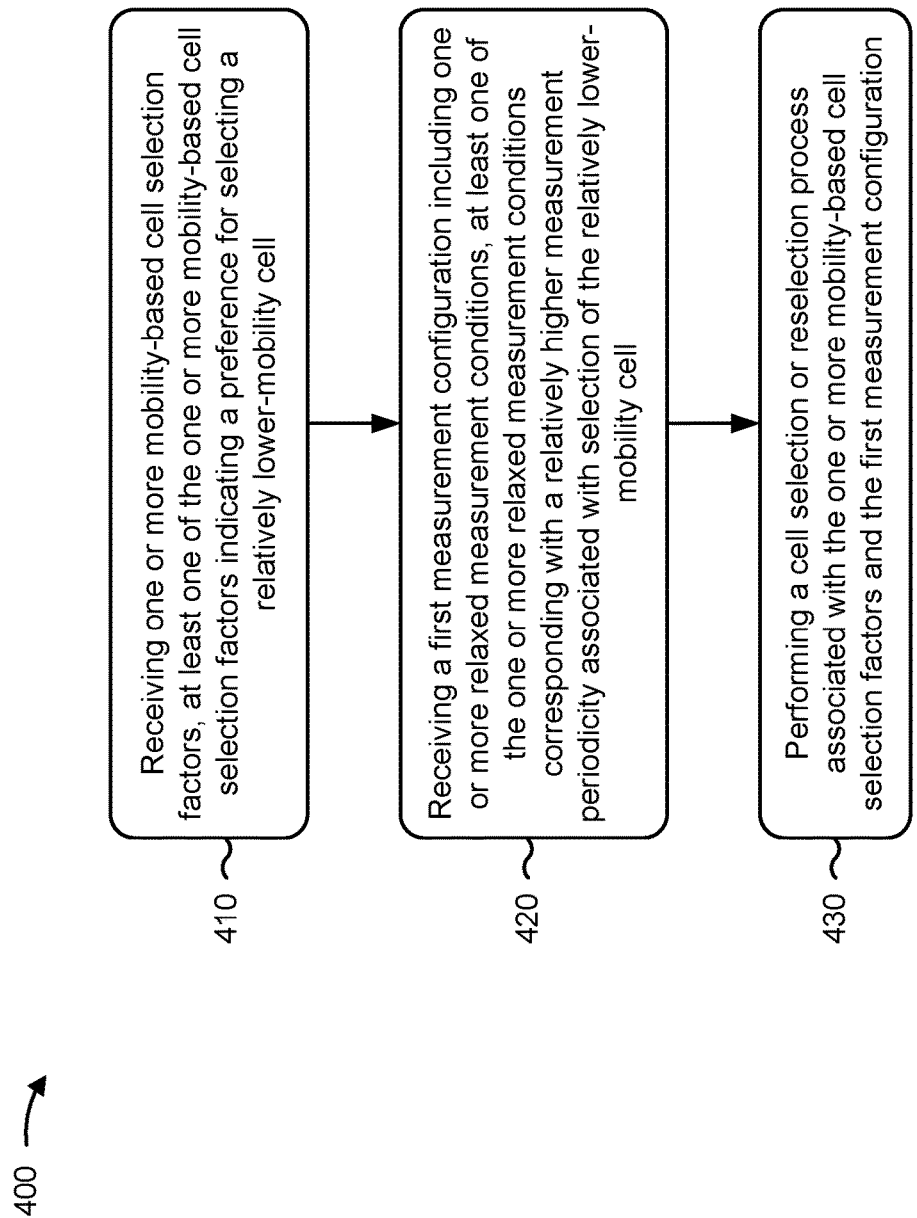
FIG. 4 is a diagram illustrating an example process which may be performed, for example, by a UE.

FIG. 4 is a diagram illustrating an example process 400 which may be performed, for example, by a UE. Although FIG. 4 shows example blocks of the process 400, in some aspects, the process 400 may include additional blocks, fewer blocks, different blocks, or differently arranged blocks than those depicted in FIG. 4. Additionally, or alternatively, in some examples two or more of the blocks of the process 400 may be performed in parallel. The process 400 may include additional aspects, such as any single aspect or any combination of aspects described herein or in connection with one or more other processes described elsewhere herein.

The process 400 involves examples of user equipment enhancements relating to mobility states, some of which involve measurement relaxation. In this example, block 410 involves receiving one or more mobility-based cell selection factors. In some instances, the one or more mobility-based cell selection factors also may include one or more mobility-based cell reselection factors. (As noted elsewhere herein, a mobility-based cell selection or reselection factor may sometimes be referred to herein simply as a "cell selection factor" for the sake of simplicity.) According to this example, at least one of the one or more mobility-based cell selection factors indicates a preference for selecting a relatively lower-mobility cell (in other words, a cell corresponding with a relatively lower-mobility condition). In some examples, block 410 may involve a UE receiving the one or more mobility-based cell selection factors from a network via a BS. The UE may, for example, be an instance of one of the UEs 120a-120e of FIG. 1, an instance of the UE 120 of FIG. 2, an instance of the UE 320a of FIG. 3, etc. For example, the UE 120 of FIG. 2 may receive the one or more mobility-based cell selection factors from a network via the BS 110, for example, using antenna 252a, DEMOD 254a, MIMO detector 256, receive processor 258, controller/processor 280, etc.

At least one of the one or more mobility-based cell selection factors may indicate a preference for selecting a relatively lower-mobility cell. In some instances, the preference for selecting the relatively lower-mobility cell may be implemented via a weighting factor for the UE to apply during the cell selection process. For example, if two BSs are determined to be satisfactory according to one or more other cell selection or reselection criteria, the BS corresponding to the lower mobility state may be chosen. In some examples, at least one mobility-based cell selection factor may indicate that cell mobility is associated with a cell coverage area. According to some such examples, at least one mobility-based cell selection factor may indicate that a relatively lower cell mobility corresponds to a relatively larger cell coverage area. In some examples, at least one mobility-based cell selection factor may indicate that a relatively lower cell mobility corresponds with a relatively longer time between actual or expected instances of cell reselection or handover for the UE during a time interval. According to some examples, at least one mobility-based cell selection factor may indicate that a relatively lower cell mobility corresponds with relatively less variation in actual or expected RSRP during a time interval.

In this example, block 420 involves receiving (in this example, by the UE and from the network) a first measurement configuration including one or more relaxed measurement conditions. According to this example, at least one of the one or more relaxed measurement conditions corresponds with a relatively higher measurement periodicity (in other words, a relatively longer time interval between measurements) associated with selection of the relatively lower-mobility cell.

According to this example, block 430 involves performing a cell selection or reselection process associated with the one or more mobility-based cell selection factors and the first measurement configuration. In some examples, the cell selection or reselection process may involve a cell reselection process. Block 430 may, for example, be performed by one or more elements of a UE control system, such as the controller/processor 280 of FIG. 2. According to some examples, the cell selection or reselection process may involve one or more measurements, based at least in part on the first measurement configuration, of two or more candidate cells.

In some examples, method 400 may involve applying (for example, by the UE) the one or more relaxed measurement conditions after the cell selection or reselection process. Applying the one or more relaxed measurement conditions may, in some examples, result in relatively lower power consumption by the UE.

According to some examples, method 400 may involve selecting a lowest-mobility cell of two or more qualifying cells that satisfy one or more cell reselection criteria, for example as described herein with reference to FIG. 3. However, in some implementations, method 400 may involve selecting a lowest-mobility cell from among two or more cells even when one or more cell reselection criteria are not satisfied.

In some examples, method 400 may involve performing, by the UE and based at least in part on the first measurement configuration, a RSRP evaluation of the two or more cells. In some such examples, the cell selection or reselection process may be associated with one or more RSRP evaluation results.

According to some examples, the cell selection or reselection process may involve choosing a cell for which the one or more relaxed measurement conditions apply. Such examples may result in power savings by the UE. In some examples, the first measurement configuration also includes one or more standard measurement conditions. In some such examples, at least one of the one or more standard measurement conditions may be associated with a relatively higher mobility state than at least one of the one or more relaxed measurement conditions. At least one of the one or more standard measurement conditions may, for example, correspond with a relative smaller time interval between measurements, as compared to at least one of the one or more relaxed measurement conditions. According to some such examples, at least one of the one or more relaxed measurement conditions is associated with a relatively lower power consumption than at least one of the one or more standard measurement conditions. In some examples, at least one of the one or more standard measurement conditions may correspond with what are defined in 3GPP TS 38.304 Release 16 as "normal-mobility state criteria" or "medium-mobility state criteria."

In some examples, the cell selection or reselection process may be associated with an estimation of whether a UE is close to the edge of a cell coverage area. According to some examples, a determination of whether to implement at least one of the one or more relaxed measurement conditions may be associated with an estimation of whether a UE is at or near a cell edge, for example as described in 3GPP TS 38.304 Release 16.

Figure 5:
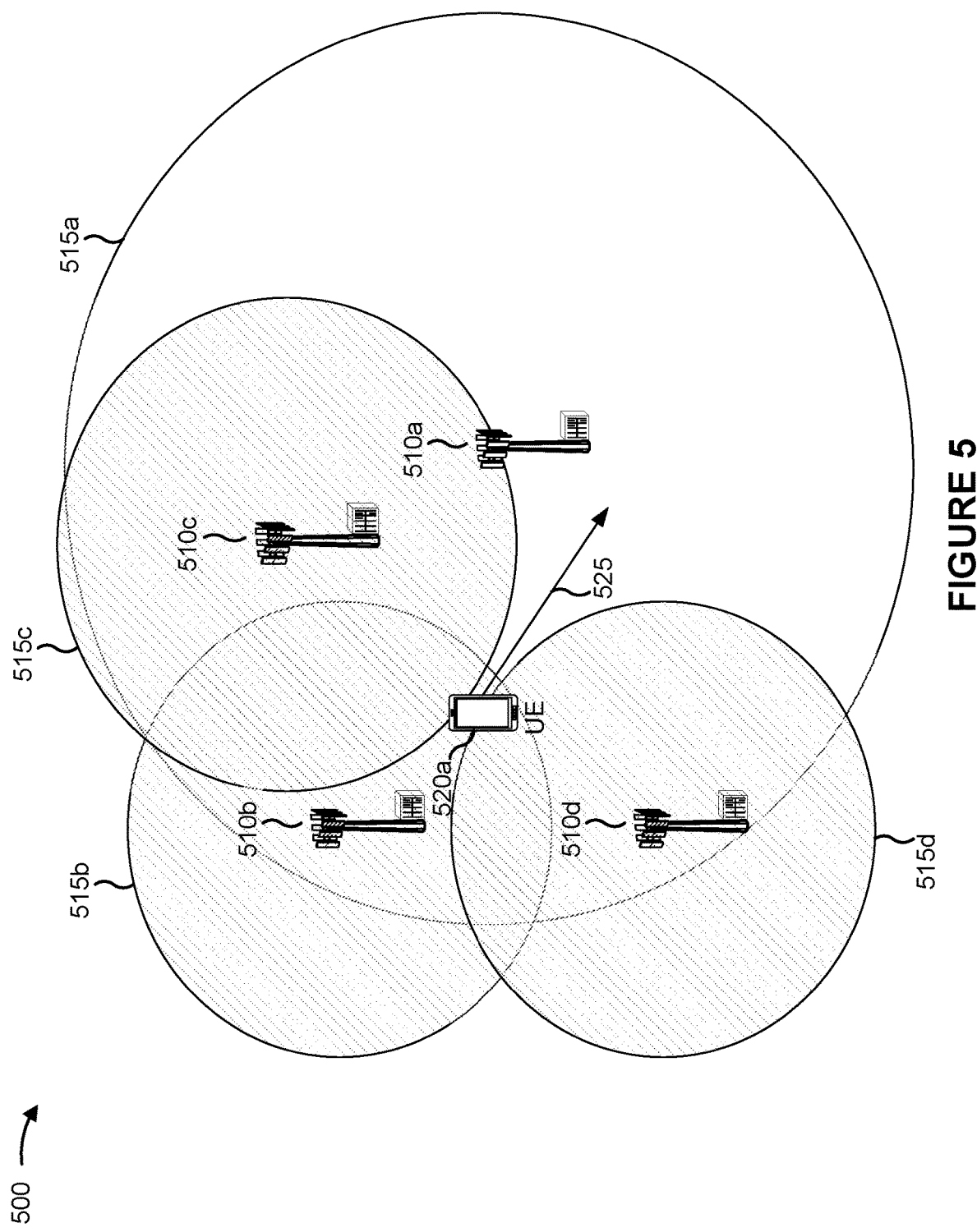
FIG. 5 is a diagram illustrating another example of a UE that is located within multiple overlapping cell coverage areas.

FIG. 5 is a diagram illustrating another example 500 of a UE that is located within multiple overlapping cell coverage areas. As with other figures provided in this disclosure, the numbers, types and arrangements of elements shown in FIG. 5 are merely made by way of example. Other implementations may include different numbers, types or arrangements of elements.

According to this example, the BSs 510a-510d are instances of the macro BS 110a of FIG. 1, and are instances of the BS 110 of FIG. 2. In some alternative examples, one or more of the BSs 510a-510d may be instances of the pico BS 110b or the femto BS 110c of FIG. 1. In this implementation, the coverage areas 515a-515d correspond to the BSs 510a-510d, respectively. In this example, the BS 510a corresponds to a first network and the BSs 510b-510d correspond to a second network. The first network and the second network correspond with what may be referred to herein as subscriber services (SUBs).

The UE 520a may, for example, be an instance of one of the UEs 120a-120e of FIG. 1, an instance of the UE 120 of FIG. 2, etc. In this example, the arrow 525 indicates the direction in which the UE 520a is moving. In this implementation, the UE 520a is configured for wireless communication via at least two networks, which in this example include the first network and the second network. In some such implementations, the UE 520a may have at least two universal integrated circuit cards (UICCs), which are also known as SIM cards. A first SIM card may correspond with the first network and a second SIM card may correspond with the second network.

According to some examples, the UE 520a may be configured to determine a mobility state corresponding to one or more of the BSs 510a-510d. In some such examples, the UE 520a may be configured to determine the mobility state(s) associated with variations in received signal strength. According to some implementations, the UE 520a may be configured to determine a mobility state associated with one or more frequencies used by a BS to provide wireless communications.

In some implementations, the UE 520a may be configured to select a network for initiating a call associated with the mobility state corresponding to the network. For example, in some instances the UE 520a may determine that the first network and the second network are both suitable for initiating a call, for example based (at least in part) on measurements of the signal strength corresponding to the BSs 510a-510d. In some instances the UE 520a may determine that the first network, which includes the BS 510a, corresponds to a lower mobility state than the second network, which includes the BSs 510b-510d. In some such examples, the UE 520a may select the first network for initiating the call.

According to some examples, the selected network may provide service at a relatively lower frequency than the unselected network. For example, the first network may provide service at 800 MHz and the second network may provide service at a higher frequency (such as 3.5 GHz). In such instances, the range of the first network's cell service will generally be greater than that of the second network's cell service. Because the mobility state of the first network will be lower than that of the second network, the UE 520a may select the SIM corresponding to the first network.

In some implementations, the network selection process may be associated with one or more cell selection criteria that are described with reference to FIGS. 3 and 4. According to some implementations, the network selection process may be associated with an estimation of whether the UE 520a is near the edge of a coverage area of one or more BSs corresponding to a network.

In some examples, a UE (such as the UE 520a of FIG. 5) may be configured for wireless communication via at least a first network and a second network. In some such examples, a method may involve selecting, associated with at least a first qualifying cell of the first network and at least a second qualifying cell of the second network each satisfying one or more cell selection criteria, the lower-mobility cell for wireless communication via the first network or the second network. Some such examples may involve determining that at least a first qualifying cell of the first network satisfies one or more cell selection criteria. For example, the UE 520a of FIG. 5 may determine that the BS 510a is a qualifying cell and that a network corresponding to the BS 510a satisfies one or more cell selection criteria, such as one or more signal-strength-based cell selection criteria. A "qualifying cell" may, for example, be a cell with which the UE 520a is configured for wireless communication via a SIM card (such as a first SIM card).

Some such examples may involve determining that at least a second qualifying cell of the second network satisfies one or more cell selection criteria. For example, the UE 520a of FIG. 5 may determine that at least one of the BSs 510b-510d, which correspond to a second network, satisfy one or more cell selection criteria. In this context a qualifying cell may, for example, be a cell with which the UE 520a is configured for wireless communication via a second SIM card, such as one or more of the BSs 510b-510d.

Some examples may involve determining whether the first qualifying cell or the second qualifying cell is a lower-mobility cell. In other words, some such examples may involve determining whether the first qualifying cell or the second qualifying cell corresponds with a lower-mobility state. Such methods may involve any appropriate mobility state determination, such as a mobility state determination that is associated with variation in received signal strength (for example, variation in RSRP).

Some examples may involve selecting the lower-mobility cell for wireless communication via the first network or the second network. For example, if the UE 520a determines that the BS 510a of FIG. 5 corresponds with a lower-mobility state than any of the BSs 510b-510d, the UE 520a may select the BS 510a for wireless communication via the first network.

According to some implementations, a user may normally use the first SIM card for one purpose (such as for personal use) and may normally use the second SIM card for another purpose (such as for business use). In some instances, the above-described method may be implemented as an "override" to this normal pattern of use. For example, the method may implemented in emergency situations. Alternatively, or additionally, the method may implemented as a user-selectable option, such as an option that is selectable via a graphical user interface (GUI) associated with a "Settings" feature of a UE.

FIG. 6 is a diagram illustrating another example 600 of a UE that is located within multiple overlapping cell coverage areas. As with other figures provided in this disclosure, the numbers, types and arrangements of elements shown in FIG. 6 are merely made by way of example. Other implementations may include different numbers, types or arrangements of elements.

According to this example, the BSs 610a-610d are instances of the macro BS 110a of FIG. 1, and are instances of the BS 110 of FIG. 2. In some alternative examples, one or more of the BSs 610a-610d (for example, BS 610b, BS 610d, or both BS 610b and BS 610d) may be instances of the pico BS 110b or the femto BS 110c of FIG. 1. In this implementation, the coverage areas 615a-615d correspond to the BSs 610a-610d, respectively.

The UE 620a may, for example, be an instance of one of the UEs 120a-120e of FIG. 1, an instance of the UE 120 of FIG. 2, etc. In this example, the arrow 625 indicates the direction in which the UE 620a is moving.

In some instances, the UE 620a may experience radio link failure (RLF). RLF frequently happens during high-mobility states due to a sudden (or a relatively faster) degradation in signal conditions. During high-mobility state operation, the UE measurement report should be sent relatively more frequently and the network should trigger handovers relatively faster. However, in some instances the signal conditions may already have degraded by the time the UE sends the measurement report or by the time the UE receives a handover.

In the example shown in FIG. 6, the BS 610a was previously providing service to the UE 620a, but at the time corresponding with the state shown in FIG. 6 the UE 620a has experienced RLF. In this example, the UE 620a is configured to search for a suitable cell after RLF is triggered and to initiate re-establishment of service on a suitable cell, if possible. In some instances, one or more suitable cells may correspond with a high-mobility state and at least one suitable cell may correspond with a lowest-mobility state. According to some implementations, the UE 620a may be configured to seek suitable cells and to trigger re-establishment on a suitable cell corresponding to the lowest-mobility state. In some such implementations, the UE 620a may receive an indication of RLF prior to performing a cell selection process that involves selecting a lowest-mobility cell of two or more qualifying cells that satisfy one or more cell selection criteria.

For example, the BS 610a may determine, after receiving an indication of RLF, that BSs 610b, 610c and 610d all satisfy one or more cell selection criteria (such as one or more cell selection criteria based on received signal strength). However, in one example the UE 620a may determine that BS 610c corresponds with a lower mobility state than BSs 610b and 610d. In this example, the UE 620a may be configured to choose BS 610c for a cell selection process.

According to some implementations, the UE 620a may be configured to trigger an "early" RLF under one or more circumstances. By triggering an early RLF, the UE 620a may have an opportunity to establish service on a neighbor cell that corresponds to a lower-mobility state. In some examples, the UE 620a may be configured to trigger an RLF based at least in part on whether the serving cell corresponds with a high-mobility state. For example, the UE 620a may be configured to trigger an RLF when the serving cell corresponds with a high-mobility state and responsive to one or more of detected retransmissions, a detected out-of-synchronization condition, etc.

Some early RLF implementations may involve reducing one or more thresholds used by the UE 620a to trigger an RLF. In some such implementations, one of the one or more mobility-based cell selection factors that are described with reference to FIG. 4 may involve a reduced threshold for determining RLF when a serving cell corresponds with a high-mobility state. In some such examples, method 400 may involve implementing the reduced threshold for determining the RLF associated with (for example, based in part on) a current serving cell corresponding with a high-mobility state. In some implementations, the UE 620a may be configured to trigger an RLF associated with determining that one or more neighbor cells correspond with one or more relatively more relaxed measurement parameters than those of the serving cell.

According to some implementations, an early RLF may be triggered according to one or more mobility-based cell selection factors that the UE 620a may have received for use when the UE 620a is in an idle mode. Some such implementations may involve applying one or more mobility-based cell selection factors intended for use in idle mode while the UE 620a is in connected mode.

Implementation examples are described in the following numbered clauses:

1. A method for wireless communication by a user equipment (UE), including: receiving one or more mobility-based cell selection factors, at least one of the one or more mobility-based cell selection factors indicating a preference for selecting a relatively lower-mobility cell; receiving a first measurement configuration including one or more relaxed measurement conditions, at least one of the one or more relaxed measurement conditions corresponding with a relatively higher measurement periodicity associated with selection of the relatively lower-mobility cell; and performing a cell selection or reselection process associated with the one or more mobility-based cell selection factors and the first measurement configuration.

2. The method of clause 1, where at least one mobility-based cell selection factor indicates that cell mobility is associated with a cell coverage area.

3. The method of clause 2, where the at least one mobility-based cell selection factor indicates that a relatively lower cell mobility corresponds to a relatively larger cell coverage area.

4. The method of any one of clauses 1-3, where at least one mobility-based cell selection factor indicates that a relatively lower cell mobility corresponds with a relatively longer time between actual or expected instances of cell reselection or handover for the UE during a time interval.

5. The method of any one of clauses 1-4, where at least one mobility-based cell selection factor indicates that a relatively lower cell mobility corresponds with relatively less variation in actual or expected reference signal received power (RSRP) during a time interval.

6. The method of any one of clauses 1-5, where the cell selection or reselection process involves a cell reselection process and further includes selecting a lowest-mobility cell of two or more qualifying cells that satisfy one or more cell reselection criteria.

7. The method of any one of clauses 1-6, where the cell selection or reselection process involves reselecting a lowest-mobility cell from among two or more cells, associated with one or more cell reselection criteria not being satisfied.

8A. The method of any one of clauses 1-7, where the UE is configured for wireless communication via at least a first network and a second network, where the cell selection or reselection process involves a cell selection process and where the method involves: determining that at least a first qualifying cell of the first network satisfies one or more cell selection criteria; determining that at least a second qualifying cell of the second network satisfies at least one of the one or more cell selection criteria; determining whether the first qualifying cell or the second qualifying cell is a lower-mobility cell; and selecting the lower-mobility cell for wireless communication via the first network or the second network.

8B. The method of any one of clauses 1-7, where the UE is configured for wireless communication via at least a first network and a second network and where the cell selection or reselection process involves a cell selection process, further including, associated with at least a first qualifying cell of the first network and at least a second qualifying cell of the second network each satisfying one or more cell selection criteria, selecting the lower-mobility cell for wireless communication via the first network or the second network.

9. The method of any one of clauses 1-8B, where the cell selection or reselection process includes a cell selection process, further including receiving an indication of a radio link failure (RLF) prior to performing the cell selection process, where the cell selection process involves selecting a lowest-mobility cell of two or more qualifying cells that satisfy one or more cell selection criteria.

10. The method of any one of clauses 1-9, where one of the one or more mobility-based cell selection factors involves a reduced threshold for determining a radio link failure (RLF) corresponding with a high-mobility serving cell.

11. The method of clause 10, further including implementing the reduced threshold for determining the RLF associated with a current serving cell being a high-mobility cell.

12. The method of any one of clauses 1-11, where the preference for selecting the relatively lower-mobility cell includes a weighting factor for the UE to apply during the cell selection process.

13. The method of any one of clauses 1-12, further including performing, by the UE and based at least in part on the first measurement configuration, a reference signal received power (RSRP) evaluation on two or more cells, where the cell selection or reselection process is associated with one or more RSRP evaluation results.

14. The method of any one of clauses 1-13, where the cell selection or reselection process involves selecting a cell for which the one or more relaxed measurement conditions apply.

15. The method of any one of clauses 1-14, where the first measurement configuration also includes one or more standard measurement conditions and where at least one of the one or more relaxed measurement conditions is associated with a relatively lower power consumption than at least one of the one or more standard measurement conditions.

16. The method of any one of clauses 1-15, further including applying the one or more relaxed measurement conditions after the cell selection or reselection process.

17. The method of any one of clauses 1-16, where the cell selection or reselection process involves one or more measurements, based at least in part on the first measurement configuration, of two or more candidate cells.

18. A user equipment (UE) for wireless communication, including: an interface system; and a control system coupled to the interface system and configured to: receive, via the interface system, one or more mobility-based cell selection factors, at least one of the one or more mobility-based cell selection factors indicating a preference for selecting a relatively lower-mobility cell; receive, via the interface system, a first measurement configuration including one or more relaxed measurement conditions, at least one of the one or more relaxed measurement conditions corresponding with a relatively higher measurement periodicity associated with selection of the relatively lower-mobility cell; and perform a cell selection or reselection process associated with the one or more mobility-based cell selection factors and the first measurement configuration.

19. The UE of clause 18, where at least one mobility-based cell selection factor indicates that cell mobility is associated with a cell coverage area.

20. The UE of clause 19, where the at least one mobility-based cell selection factor indicates that a relatively lower cell mobility corresponds to a relatively larger cell coverage area.

21. The UE of any one of clauses 18-20, where at least one mobility-based cell selection factor indicates that a relatively lower cell mobility corresponds with a relatively longer time between actual or expected instances of cell reselection or handover for the UE during a time interval.

22. The UE of any one of clauses 18-21, where at least one mobility-based cell selection factor indicates that a relatively lower cell mobility corresponds with relatively less variation in actual or expected reference signal received power (RSRP) during a time interval.
23. The UE of any one of clauses 18-22, where the cell selection or reselection process involves selecting a cell for which the one or more relaxed measurement conditions apply.
24. The UE of any one of clauses 18-23, where the first measurement configuration also includes one or more standard measurement conditions and where at least one of the one or more relaxed measurement conditions is associated with a relatively lower power consumption than at least one of the one or more standard measurement conditions.
25. The UE of any one of clauses 18-24, further including applying the one or more relaxed measurement conditions after the cell selection or reselection process.
26. The UE of any one of clauses 18-25, where the cell selection or reselection process involves one or more measurements, based at least in part on the first measurement configuration, of two or more candidate cells.
27. A user equipment (UE) for wireless communication, including: interface means; and control means for: receiving, via the interface means, one or more mobility-based cell selection factors, at least one of the one or more mobility-based cell selection factors indicating a preference for selecting a relatively lower-mobility cell; receiving, via the interface means, a first measurement configuration including one or more relaxed measurement conditions, at least one of the one or more relaxed measurement conditions corresponding with a relatively higher measurement periodicity associated with selection of the relatively lower-mobility cell; and performing a cell selection or reselection process associated with the one or more mobility-based cell selection factors and the first measurement configuration.
28. The UE of clause 27, where at least one mobility-based cell selection factor indicates that cell mobility is associated with a cell coverage area.
29. One or more non-transitory media having one or more instructions for wireless communication stored thereon which, when executed by a control system of a user equipment, may cause the control system to: receive one or more mobility-based cell selection factors, at least one of the one or more mobility-based cell selection factors indicating a preference for selecting a relatively lower-mobility cell; receive a first measurement configuration including one or more relaxed measurement conditions, at least one of the one or more relaxed measurement conditions corresponding with a relatively higher measurement periodicity associated with selection of the relatively lower-mobility cell; and perform a cell selection or reselection process associated with the one or more mobility-based cell selection factors and the first measurement configuration.
30. The one or more non-transitory media of clause 29, where at least one mobility-based cell selection factor indicates that cell mobility is associated with a cell coverage area.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, or a combination of hardware and software. As used herein, a processor is implemented in hardware, firmware, or a combination of hardware and software. As used herein, the phrase "based on" is intended to be broadly construed to mean "based at least in part on."

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, or the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the aspects disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, for example, a combination of a DSP and a microprocessor, a plurality of microprocessors, one or more microprocessors in conjunction with a DSP core, or any other such configuration. In some aspects, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Aspects of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the aspects described in this disclosure may be readily apparent to those skilled in the art, and the generic principles defined herein may be applied to other aspects without departing from the spirit or scope of this disclosure. Thus, the claims are not intended to be limited to the aspects shown herein, but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate aspects also can be implemented in combination in a single aspect. Conversely, various features that are described in the context of a single aspect also can be implemented in multiple aspects separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the aspects described herein should not be understood as requiring such separation in all aspects, and it should be understood that the described program components and systems can generally be integrated together in a single software product or packaged into multiple software products. Additionally, other aspects are within the scope of the following claims. In some cases, the actions recited in the claims can be performed in a different order and still achieve desirable results.

What is claimed is:

1. A method for wireless communication by a user equipment (UE), comprising:
    receiving one or more mobility-based cell selection factors, at least one of the one or more mobility-based cell selection factors indicating a preference for selecting a relatively lower-mobility cell;
    receiving a first measurement configuration including one or more relaxed measurement conditions, at least one of the one or more relaxed measurement conditions corresponding with a relatively higher measurement periodicity associated with selection of the relatively lower-mobility cell; and
    performing a cell reselection process including selecting a lowest-mobility cell of two or more qualifying cells that satisfy one or more cell reselection criteria.

2. The method of claim 1, wherein the cell reselection process is associated with the one or more mobility-based cell selection factors and the first measurement configuration.

3. The method of claim 1, wherein the at least one mobility-based cell selection factor indicates that a relatively lower cell mobility corresponds to a relatively larger cell coverage area.

4. The method of claim 1, wherein at least one mobility-based cell selection factor indicates that a relatively lower cell mobility corresponds with a relatively longer time between actual or expected instances of cell reselection or handover for the UE during a time interval.

5. The method of claim 1, wherein at least one mobility-based cell selection factor indicates that a relatively lower cell mobility corresponds with relatively less variation in actual or expected reference signal received power (RSRP) during a time interval.

6. The method of claim 1, wherein the cell reselection process involves:
    reselecting a lowest-mobility cell from among two or more cells, associated with one or more cell reselection criteria not being satisfied.

7. The method of claim 1, wherein the UE is configured for wireless communication via at least a first network and a second network, further comprising, associated with at least a first qualifying cell of the first network and at least a second qualifying cell of the second network each satisfying one or more cell selection criteria, a cell selection process that involves selecting the lower-mobility cell for wireless communication via the first network or the second network.

8. The method of claim 1, further comprising a cell selection process that involves:
    receiving an indication of a radio link failure (RLF) prior to performing the cell selection process, and wherein the cell selection process involves:
    selecting a lowest-mobility cell of two or more qualifying cells that satisfy one or more cell selection criteria.

9. The method of claim 1, wherein one of the one or more mobility-based cell selection factors involves a reduced threshold for determining a radio link failure (RLF) corresponding with a high-mobility serving cell.

10. The method of claim 9, further comprising:
    implementing the reduced threshold for determining the RLF associated with a current serving cell being a high-mobility cell.

11. The method of claim 1, wherein the preference for selecting the relatively lower-mobility cell comprises a weighting factor for the UE to apply during a cell selection process.

12. The method of claim 1, further comprising performing, by the UE and based at least in part on the first measurement configuration, a reference signal received power (RSRP) evaluation on two or more cells, wherein the cell reselection process is associated with one or more RSRP evaluation results.

13. The method of claim 1, wherein the cell reselection process involves selecting a cell for which the one or more relaxed measurement conditions apply.

14. The method of claim 1, wherein the first measurement configuration also includes one or more standard measurement conditions and wherein at least one of the one or more relaxed measurement conditions is associated with a relatively lower power consumption than at least one of the one or more standard measurement conditions.

15. The method of claim 1, further comprising applying the one or more relaxed measurement conditions after the cell reselection process.

16. The method of claim 1, wherein the cell reselection process involves one or more measurements, based at least in part on the first measurement configuration, of two or more candidate cells.

17. A user equipment (UE) for wireless communication, comprising:
an interface system; and
a control system coupled to the interface system and configured to:
receive, via the interface system, one or more mobility-based cell selection factors, at least one of the one or more mobility-based cell selection factors indicating a preference for selecting a relatively lower-mobility cell;
receive, via the interface system, a first measurement configuration including one or more relaxed measurement conditions, at least one of the one or more relaxed measurement conditions corresponding with a relatively higher measurement periodicity associated with selection of the relatively lower-mobility cell; and
perform a cell selection or reselection process associated with the one or more mobility-based cell selection factors and the first measurement configuration wherein the cell reselection process involves reselecting a lowest-mobility cell from among two or more cells, associated with one or more cell reselection criteria not being satisfied.

18. The UE of claim 17, wherein at least one mobility-based cell selection factor indicates that cell mobility is associated with a cell coverage area.

19. The UE of claim 18, wherein the at least one mobility-based cell selection factor indicates that a relatively lower cell mobility corresponds to a relatively larger cell coverage area.

20. The UE of claim 17, wherein at least one mobility-based cell selection factor indicates that a relatively lower cell mobility corresponds with a relatively longer time between actual or expected instances of cell reselection or handover for the UE during a time interval.

21. The UE of claim 17, wherein at least one mobility-based cell selection factor indicates that a relatively lower cell mobility corresponds with relatively less variation in actual or expected reference signal received power (RSRP) during a time interval.

22. The UE of claim 17, wherein the cell selection or reselection process involves selecting a cell for which the one or more relaxed measurement conditions apply.

23. The UE of claim 17, wherein the first measurement configuration also includes one or more standard measurement conditions and wherein at least one of the one or more relaxed measurement conditions is associated with a relatively lower power consumption than at least one of the one or more standard measurement conditions.

24. The UE of claim 17, further comprising applying the one or more relaxed measurement conditions after the cell selection or reselection process.

25. The UE of claim 17, wherein the cell selection or reselection process involves one or more measurements, based at least in part on the first measurement configuration, of two or more candidate cells.

26. A user equipment (UE) for wireless communication, comprising:
interface means; and
control means for:
receiving, via the interface means, one or more mobility-based cell selection factors, at least one of the one or more mobility-based cell selection factors indicating a preference for selecting a relatively lower-mobility cell and one of the one or more mobility-based cell selection factors involving a reduced threshold for determining a radio link failure (RLF) corresponding with a high-mobility serving cell;
receiving, via the interface means, a first measurement configuration including one or more relaxed measurement conditions, at least one of the one or more relaxed measurement conditions corresponding with a relatively higher measurement periodicity associated with selection of the relatively lower-mobility cell; and
performing a cell selection or reselection process associated with the one or more mobility-based cell selection factors and the first measurement configuration.

27. The UE of claim 26, wherein at least one mobility-based cell selection factor indicates that cell mobility is associated with a cell coverage area.

28. One or more non-transitory media having one or more instructions for wireless communication stored thereon which, when executed by a control system of a user equipment, may cause the control system to:
receive one or more mobility-based cell selection factors, at least one of the one or more mobility-based cell selection factors indicating a preference for selecting a relatively lower-mobility cell;
receive a first measurement configuration including one or more relaxed measurement conditions, at least one of the one or more relaxed measurement conditions corresponding with a relatively higher measurement periodicity associated with selection of the relatively lower-mobility cell and one of the one or more mobility-based cell selection factors involving a reduced threshold for determining a radio link failure (RLF) corresponding with a high-mobility serving cell; and
perform a cell selection or reselection process associated with the one or more mobility-based cell selection factors and the first measurement configuration.

29. The one or more non-transitory media of claim 28, wherein at least one mobility-based cell selection factor indicates that cell mobility is associated with a cell coverage area.

* * * * *